US012695370B2

(12) United States Patent
Wei et al.

(10) Patent No.: US 12,695,370 B2
(45) Date of Patent: Jul. 28, 2026

(54) ASYMMETRIC POWER CONVERTER FOR IMPROVED EFFICIENCY AND OPERATION

(71) Applicant: Rivian IP Holdings, LLC, Irvine, CA (US)

(72) Inventors: Lixiang Wei, Irvine, CA (US); Yang Liu, Irvine, CA (US); Steven Schulz, Torrance, CA (US); Silva Hiti, Redondo Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 318 days.

(21) Appl. No.: 18/375,352

(22) Filed: Sep. 29, 2023

(65) Prior Publication Data

US 2025/0112560 A1     Apr. 3, 2025

(51) Int. Cl.
 *H02M 1/00* (2007.01)
 *H02M 7/00* (2006.01)

(52) U.S. Cl.
 CPC ........... *H02M 1/007* (2021.05); *H02M 7/003* (2013.01); *H02M 1/008* (2021.05)

(58) Field of Classification Search
 CPC ...... H02M 1/007; H02M 3/003; H02M 7/003; H02M 1/008; H02J 1/084; H02J 1/10; H02J 1/102; H02J 1/106; H02J 1/109; H02J 1/14; H02J 7/02
 See application file for complete search history.

(56) References Cited

U.S. PATENT DOCUMENTS

| | | | | |
|---|---|---|---|---|
| 2005/0108582 A1* | 5/2005 | Fung | ..................... | G06F 1/3209 713/300 |
| 2019/0181768 A1* | 6/2019 | Chennamsetty | ........ | H02M 1/08 |
| 2020/0136493 A1* | 4/2020 | Young | ..................... | H02M 7/81 |
| 2020/0244096 A1* | 7/2020 | Tabuchi | ................ | H02M 3/158 |
| 2022/0158549 A1* | 5/2022 | Lu | ........................... | B60L 53/11 |
| 2024/0124989 A1* | 4/2024 | Ballantine | ................. | H02J 9/06 |
| 2024/0326634 A1* | 10/2024 | Tang | ..................... | H02J 7/0013 |
| 2024/0359567 A1* | 10/2024 | Bunnell | ................ | B60L 15/007 |

OTHER PUBLICATIONS

N. Grass et al., "DC connected modular power converter system for microgrids," 2017 IEEE Second International Conference on DC Microgrids (ICDCM), Nuremburg, Germany, 2017, pp. 383-386, doi: 10.1109/ICDCM.2017.8001074. (Year: 2017).*

"Reliability consideration for power supplies," CUI, Inc., Apr. 2019. Obtained on Oct. 14, 2025 at https://www.belfuse.com/media/documents/whitepapers/reliability-considerations-for-power-supplies.pdf (Year: 2019).*

Specification and drawings from U.S. Appl. No. 63/416,290, filed Oct. 14, 2022. (Year: 2022).*

* cited by examiner

*Primary Examiner* — Fred E Finch, III
(74) *Attorney, Agent, or Firm* — HG LAW LLP

(57) ABSTRACT

Systems and methods for operating an asymmetric power converter for improved efficiency, service life, and operation are provided herein. In some embodiments, the system includes a power electronics module (PEM) configured to convert between alternating current (AC) power and direct current (DC) power. The power electronics module includes a power converter having a nominal power rating, and an overrated power converter having an overrated power rating with respect to the nominal power rating, wherein the power converter is one of an AC to DC power converter and a DC to DC power converter and the overrated power converter is the other of the AC to DC power converter and the DC to DC power converter.

20 Claims, 9 Drawing Sheets

300

400

500

600

900 ⬎

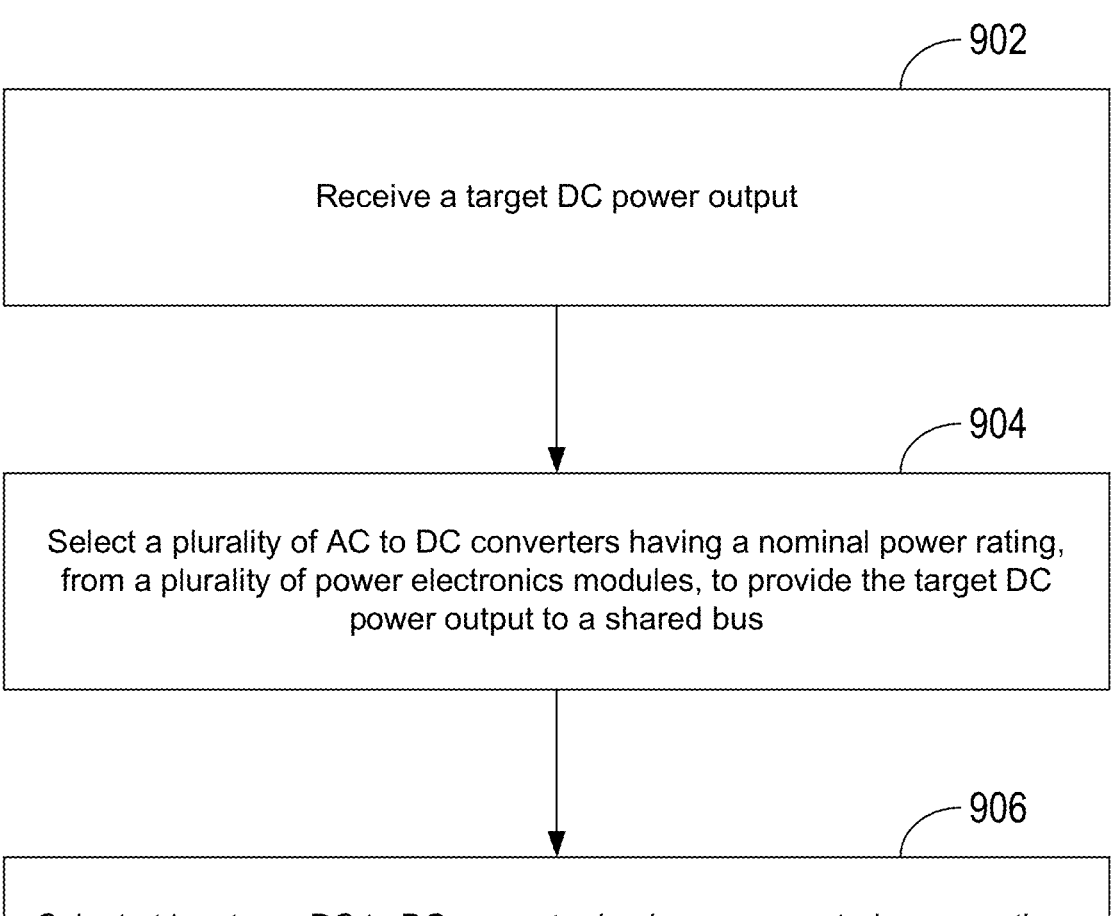

902

Receive a target DC power output

904

Select a plurality of AC to DC converters having a nominal power rating, from a plurality of power electronics modules, to provide the target DC power output to a shared bus

906

Select at least one DC to DC converter having an overrated power rating, from the plurality of power electronics modules, to provide the target DC power output from the shared bus to a load

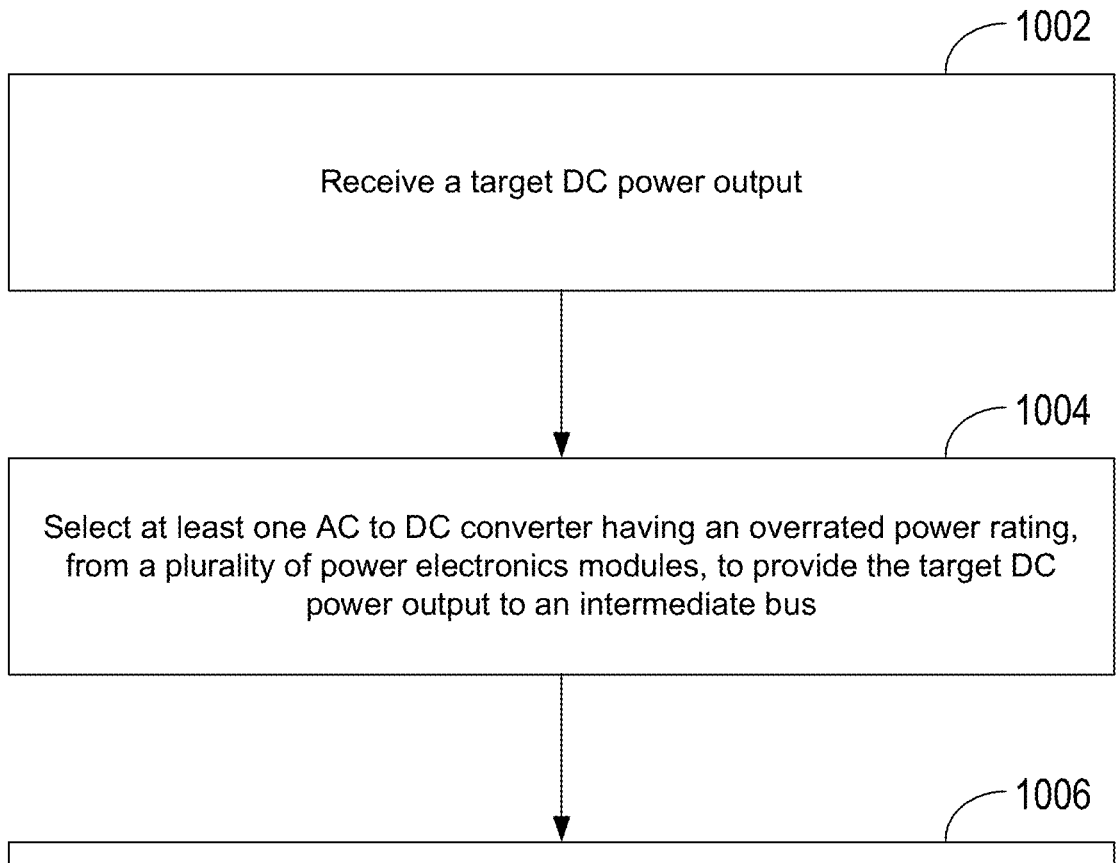

1002

Receive a target DC power output

1004

Select at least one AC to DC converter having an overrated power rating, from a plurality of power electronics modules, to provide the target DC power output to an intermediate bus

1006

Select a plurality of DC to DC converters having nominal power ratings, from the plurality of power electronics modules, to provide the target DC power output from the intermediate bus to a load

FIG. 10

ASYMMETRIC POWER CONVERTER FOR IMPROVED EFFICIENCY AND OPERATION

The present disclosure is directed to power electronics equipment for providing power to a load. More specifically, the present disclosure is directed to power electronics packages designed for improved efficiency, greater service life, and/or optimized system packaging.

SUMMARY

In accordance with some embodiments of the present disclosure, systems and methods are provided for converting between alternating current (AC) power and direct current (DC) power using an asymmetrically designed power electronics module. In some embodiments, the system includes a power electronics module configured to convert between AC power and DC power, where the power electronics module includes a power converter having a nominal power rating, and an overrated power converter having an overrated power rating with respect to the nominal power rating. In some embodiments, the power converter is one of an AC to DC power converter and a DC to DC power converter and the overrated power converter is the other of the AC to DC power converter and the DC to DC power converter. For example, an asymmetrically designed power electronics module may include an AC to DC power converter having a nominal power rating (e.g., 50 kW converter) and an overrated DC to DC power converter (e.g., 100 KW converter). In some embodiments, the DC to DC converter is isolated between the input and the output of the power electronics module.

In some embodiments, the overrated power converter has a power conversion efficiency that is greater when operating at the nominal power rating than at the overrated power rating.

In some embodiments, the overrated power converter has an expected service life that is longer at the nominal power rating than at the overrated power rating.

In some embodiments, the overrated power converter occupies more than half of a packaging space of the power electronics module.

In some embodiments, more than half of a total heat capacity of the power electronics module is utilized by the overrated power converter when operating at the overrated power rating.

In some embodiments, the power converter is the AC to DC power converter and the overrated power converter is the DC to DC power converter.

In some embodiments, the power converter is coupled in series to the overrated power converter.

In some embodiments, the power electronics module is a first power electronics module, and the system also includes a plurality of power electronics modules, each including an AC to DC power converter and a DC to DC power converter, and a shared DC bus, wherein an output of the AC to DC power converter of each of the plurality of power electronics modules is electrically coupled to the shared DC bus.

In some embodiments, the system also includes control circuitry configured to cause output power of at least two of the AC to DC power converters to provide a net DC power over the shared DC bus to one of the DC to DC power converters, and to cause the one DC to DC power converter to provide a net DC power to a load.

In some embodiments, the system also includes an output switching bus configured to provide a net output power from at least two of the DC to DC power converters to a load.

In some embodiments, the system also includes control circuitry configured to cause output power of one of the AC to DC power converters to be provided as shared DC power over the shared DC bus to at least two of the DC to DC power converters.

In some embodiments, the method includes converting an AC input power to a DC output power using a power converter having a nominal power rating and an overrated power converter having an overrated power rating with respect to the nominal power rating, wherein the power converter is one of an AC to DC power converter and a DC to DC power converter and the overrated power converter is the other of the AC to DC power converter and the DC to DC power converter.

In some embodiments, operating the overrated power converter at the nominal power rating improves an efficiency of the overrated power converter as compared to operating the overrated power converter at the overrated power rating.

In some embodiments, operating the overrated power converter at the nominal power rating extends a service life of the overrated power as compared to operating the overrated power converter at the overrated power rating.

In some embodiments, the method also includes packaging the power converter and the overrated power converter in a single enclosure having a volume, wherein the overrated power converter occupies more than half of the volume.

In some embodiments, the method also includes packaging the power converter and the overrated power converter in a single enclosure with a heat capacity limit, wherein the overrated power converter utilizes more than half of the heat capacity limit.

In some embodiments, the power converter and the overrated power converter comprise a power electronics module, and the method also includes electrically coupling the power electronics module to at least one other power electronics module through a shared DC bus.

In some embodiments, the method also includes controlling at least two nominal power converters to provide power to one overrated power converter.

In some embodiments, the method also includes coupling a net power output from at least one of the power electronics modules to a load.

In some embodiments, a power cabinet includes a plurality of power electronics modules, each power electronics module including an AC to DC converter and a DC to DC converter, wherein one of the AC to DC converter and the DC to DC converter has a nominal power rating and the other one of the AC to DC converter and the DC to DC converter as an overrated power rating greater than the nominal power rating.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9 is an illustrative flowchart of a method for providing a target DC power output using a plurality of nominal AC to DC converters and at least one overrated DC to DC converter, in accordance with some embodiments of the present disclosure; and FIG. 10 is an illustrative flowchart of a method for providing a target DC power output using at least one overrated AC to DC converter and a plurality of nominal DC to DC converters, in accordance with some embodiments of the present disclosure.

DETAILED DESCRIPTION

Figure 1:
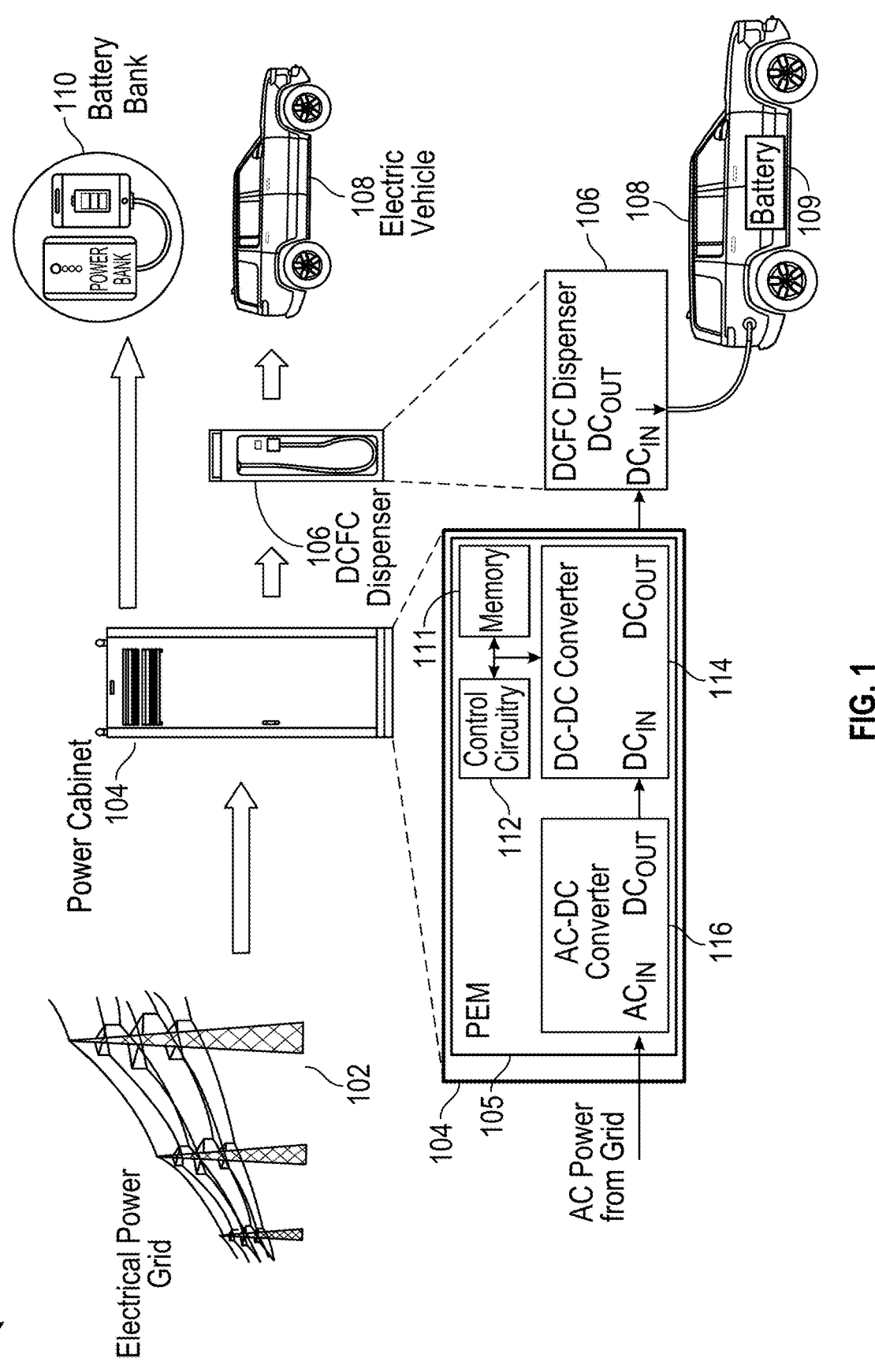
FIG. 1 shows an illustrative block diagram of an electric vehicle charging system including an asymmetrically designed power electronics package, in accordance with some embodiments of the disclosure.

Power electronics equipment can be used to perform power conversions, including converting from alternating current (AC) power to direct current (DC) power and converting between discrete voltage levels of DC power. Electric power grids typically provide AC power, whereas many types of electronic equipment (e.g., electric vehicles, batteries, heaters, and other equipment) often operate on DC power. As a result, powering such electronic equipment using energy from the electric grid generally requires equipment to convert the AC grid power to DC power. In some configurations, AC to DC converters provide a DC voltage level that is generally equal to the average AC voltage level.

For certain DC power applications, such as those requiring high levels of energy input (e.g., fast charging of electric vehicles and/or batteries), it is desirable to provide a high DC voltage level. To use the electric power grid as a source for such high levels of energy, the AC grid power may initially be converted to a first DC power and then that first DC power may be converted to a second DC power (e.g., having a higher voltage level). In some embodiments, the second DC power can provide more instantaneous energy to a load without exceeding a current capacity limit.

Thus, a system including an AC to DC power converter and a DC to DC power converter may readily receive AC power supplied by the grid and correspondingly serve high levels of DC power to a load. These power converters are coupled in series and have equal maximum power ratings. Because such an arrangement includes two converters that are coupled to each other and have equal maximum power ratings, the overall power converter is symmetrical. As used herein, a "symmetrical power converter" includes an AC to DC power converter and a DC to DC power converter each with the same maximum power rating.

However, certain criteria or constraints imposed on power conversion applications may be better served by asymmetrical power electronics modules, in which an AC to DC power converter and a DC to DC power converter are coupled to each other but have different maximum power ratings. Because of these different power ratings, the resulting power electronics module is asymmetrical. As used herein, an "asymmetrical power electronics module" includes an AC to DC power converter with a first maximum power rating and a DC to DC power converter with a second maximum power rating, different from the first.

The asymmetrical power electronics module may realize improvements in efficiency, service life, thermal capacity management, and/or packaging when compared to a symmetrical power converter. In some embodiments, these improvements may occur because at least one of the AC to DC or DC to DC power converters may convert power levels below its respective maximum power rating, and their electric power conversion efficiency, expected service life, heat dissipation, and equipment volume may vary as a function of the ratio between a current power level over a maximum power rating. In some embodiments, such as when both of the AC to DC and DC to DC power converters operate at their respective and asymmetrical maximum power ratings, these improvements may occur because fewer total power converters may be required to deliver a target amount of power.

For example, a certain application may have a target power output. At this target power output, a given DC to DC power converter topology may be most efficient when running at 80% of its maximum power rating, whereas a given AC to DC power converter topology may be most efficient when running at 100% of its maximum power rating. In such a configuration, an asymmetrical power electronics module including a DC to DC power converter with a maximum power rating equal to 125% that of the AC to DC power converter could operate at the full maximum power rating of the AC to DC power converter and realize improved efficiency over the corresponding symmetrical power converter (i.e., with the DC to DC power converter having a maximum power rating equal to 100% that of the AC to DC power converter).

In accordance with the present disclosure, asymmetrical power electronics module systems and methods of operation are disclosed. As used herein, the term "nominal power rating" refers to the maximum power rating for the power converter in an asymmetrical power electronics module having the lower power rating, and the term "overrated power rating" refers to the maximum power rating for the other converter having the higher power rating. Additionally, the term "overrated power converter" is used to refer to the power converter having the higher power rating, and the term "nominal power converter" is used to refer to the power converter having the lower power rating.

FIG. 1 depicts an illustrative block diagram 100 of an electric vehicle charging system including a power electronics module (PEM), in accordance with some embodiments of the disclosure. Power is input to the system by electrical power grid 102, which is coupled to power cabinet 104. Power cabinet 104 includes asymmetrical PEM 105, as shown in the exploded view, as well as other components. Power cabinet 104 is coupled to direct current fast charge (DCFC) dispenser 106, which ultimately delivers power to electric vehicle 108 (specifically battery 109 therein), and/or to battery bank 110. As used herein, either of battery 109 or battery bank 110 may be referred to as an energy storage device. PEM 105 includes memory 111 and control circuitry 112, where memory 111 may include instructions for operating control circuitry 112 under various operations including regular charging. PEM 105 also includes DC to DC converter 114, which conditions the DC power to be properly received by electric vehicle 108 through DCFC dispenser 106 or battery bank 110. Additionally included in PEM 105 is AC to DC converter 116, which converts incoming AC power from the electric grid to intermediate DC power that can then be converted again for charging connected devices. While power cabinet 104 is depicted as providing DC power to an energy storage device, power cabinet 104 may provide power to any type of load.

Figure 2:
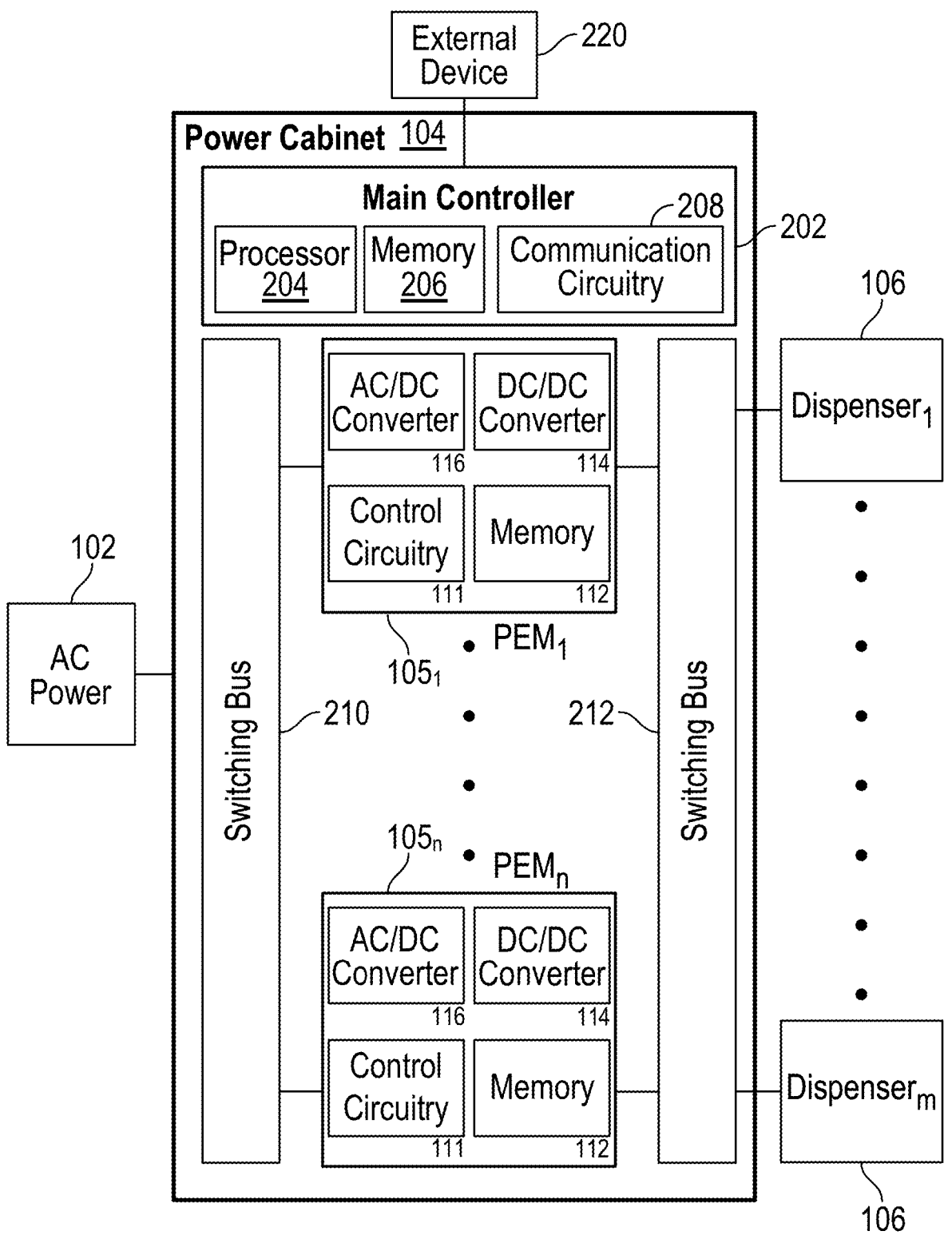
FIG. 2 is an illustrative block diagram showing additional details of some components of a power cabinet, in accordance with some embodiments of the disclosure.

FIG. 2 is an illustrative block diagram showing additional details of some components of power cabinet 104, in accordance with some embodiments of the disclosure. The power cabinet 104 includes one or more PEMs 105, main controller 202, and at least two switching buses 210 and 212. The input of power cabinet 104 is coupled to AC power 102 via switching bus 210. The output of power cabinet 104 is coupled to one or more dispensers 106 via switching bus 212. One or more PEMs 105 each include a respective AC/DC converter 116 and DC/DC converter 114. In some embodiments, DC/DC converter 114 is isolated from an input to power cabinet 104 (e.g., AC power 102) and is isolated from an output of power cabinet 104 (e.g., dispenser 106). According to instructions from main controller 202, which may be executed by processor 204 and stored in memory 206, each PEM $105_{1-n}$ may be coupled to any one of dispensers $106_{1-m}$ during a given charging operation. In some embodiments, such as to increase the power output provided to a single dispenser 106, multiple PEMs 105 may be simultaneously coupled in parallel to a single dispenser 106 and provide it with a net power output, where the respective power output of each PEM 105 may be summed to a net power output through switching bus 212.

Main controller 202 of power cabinet 104 additionally includes communication circuitry 208. Communication circuitry 208 may be configured to at least communicate with each PEM 105 within power cabinet 104, with an external device (e.g., a facility monitoring system, alarm system, grid monitoring system, circuit breaker, smart phone, computer, tablet, IoT device, other power cabinet 104, a load receiving output power, charger management system, or any other suitable device), and with switching buses 210 and 212.

Main controller 202 may control the switches of switching buses 210 and 212 to provide appropriate power to the dispensers 106. In some embodiments, main controller 202 may control additional switching buses and/or contact to power buses that may be present within a power cabinet. Main controller 202 may further instruct relevant PEMs 105 to operate at desired power levels to provide target power to the dispensers 106 and/or to accomplish other operational goals (e.g., for improved efficiency, service life, utilization of thermal capacity, and/or utilization of packaging space). In some embodiments, main controller 202 coordinates the operation of a first number of nominal power converters and a second number, less than the first, of overrated power converters to operate an asymmetrical power electronics module.

Figure 3:
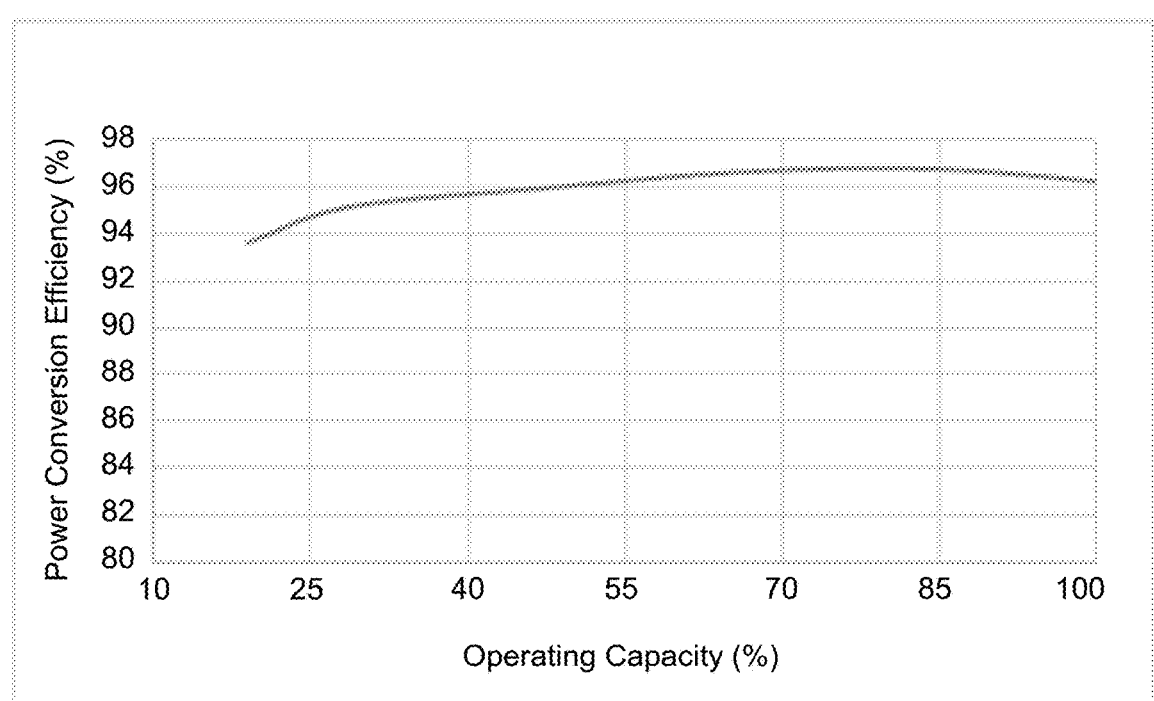
FIG. 3 is an illustrative graph of power converter efficiency versus operating capacity, in accordance with some embodiments of the present disclosure.

FIG. 3 is an illustrative graph of power converter efficiency versus operating capacity, in accordance with some embodiments of the present disclosure. The vertical axis displays the power conversion efficiency (%) of a power converter (e.g., an AC to DC or DC to DC power converter) as a function of the operating capacity (%) of the power converter. As used herein, the operating capacity is defined for a power converter as the ratio of a power level being converted over a maximum power rating of the power converter. A power converter corresponding to the performance characteristics of FIG. 3 would have a maximum power conversion efficiency when functioning at ~80% of its operating capacity.

The data of FIG. 3 is representative of certain power converters. Other power converters may have maximum power conversion efficiencies at different operating capacity values (e.g., 50%, 60%, 70%, 80%, 100%, or other operating capacities). In some embodiments, a power electronics module includes an AC to DC power converter and a DC to DC power converter with different operating capacity values corresponding to the respective maximum power conversion efficiencies. By making such a power electronics module asymmetric, the net power efficiency may be greater than a corresponding symmetric power electronics module. In some embodiments, a given DC to DC power converter topology may have a maximum power conversion efficiency at 80% of its operating capacity, and a given AC to DC power converter topology may have a maximum power conversion efficiency at 100% of its operating capacity; a corresponding asymmetrical power electronics module may include that DC to DC power converter topology as the overrated converter with a maximum power rating of 100 kW and may include that AC to DC power converter topology as the nominal converter with a maximum power rating of 80 kW. In such a configuration, the resulting asymmetrical power electronics module may convert 80 kW of AC input power to 80 KW of DC output power and thereby maximize the power conversion efficiency of each component therein.

Considering long-term operation of power electronics modules and the corresponding conversion of large quantities of power, it is desirable to maximize the power conversion efficiency. Compared to a less efficient approach, a maximally efficient power electronics module saves money for users, charges loads faster, reduces strain on the electric grid, reduces greenhouse gas emissions, and offers additional benefits. Such benefits may be better realized by an asymmetrical power electronics module than by a symmetrical power electronics module.

Figure 4:
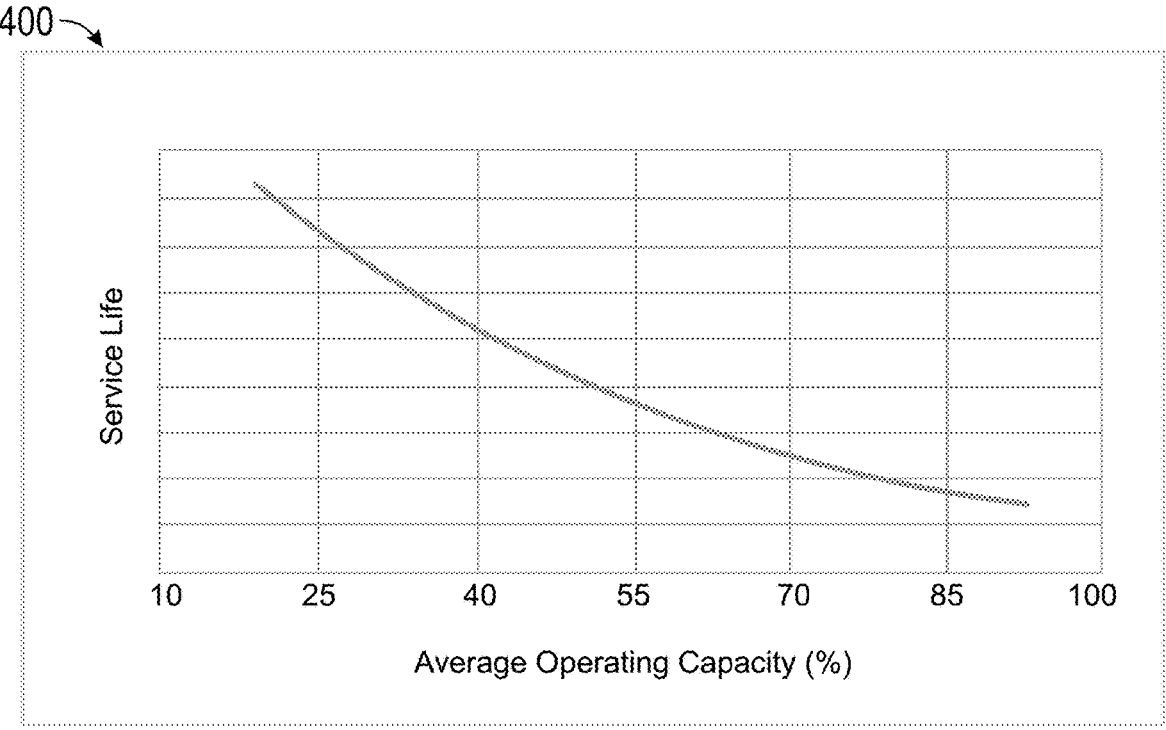
FIG. 4 is an illustrative graph of power converter service life versus operating capacity, in accordance with some embodiments of the present disclosure.

FIG. 4 is an illustrative graph of power converter service life versus operating capacity, in accordance with some embodiments of the present disclosure. The vertical axis displays the service life of a power converter (e.g., an AC to DC or DC to DC power converter) as a function of the average operating capacity (%) of the power converter. As used herein, the service life is defined for a power converter as the amount of power it can convert before typically failing. In practice, while service life varies based on many operational and environmental factors, it is generally extended by improved operating efficiency (as described above) and optimized thermal management (as described below). FIG. 4 shows an illustrative and particular example that may represent continuous operation of a power converter at a fixed temperature and varying operating capacities. Under such constraints, a power converter corresponding to the performance characteristics of FIG. 4 would have a maximum service life that decreases with increasing operating capacity.

The data of FIG. 4 may be representative of certain power converters. In some embodiments, a power electronics module includes an AC to DC power converter and a DC to DC power converter with different operating capacity values corresponding to the respective maximum service lives. By making such a power electronics module asymmetric, its service life may be longer than a corresponding symmetric power electronics module.

In addition to power conversion efficiency and service life, there are other practical constraints associated with a power electronics module that may be optimized through asymmetrical design. In some embodiments, a power electronics module may be associated with a certain thermal capacity limit (e.g., a maximum amount of heat that can be removed by the components of the power electronics module), such as may be imposed by an enclosure of the power electronics module, a local regulation, a user preference, or any other thermal constraint. In some embodiments, a power electronics module may be associated with a certain volumetric limit of an enclosure, such as may be imposed by the use of an existing enclosure, an availability of space at a site housing the enclosure, a local regulation, a user preference, or any other volumetric constraint. In accordance with some embodiments of the present disclosure, asymmetrical power electronics modules are designed to better optimize performance under thermal and volumetric constraints, as compared to a corresponding symmetrical power electronics module.

Figure 5:
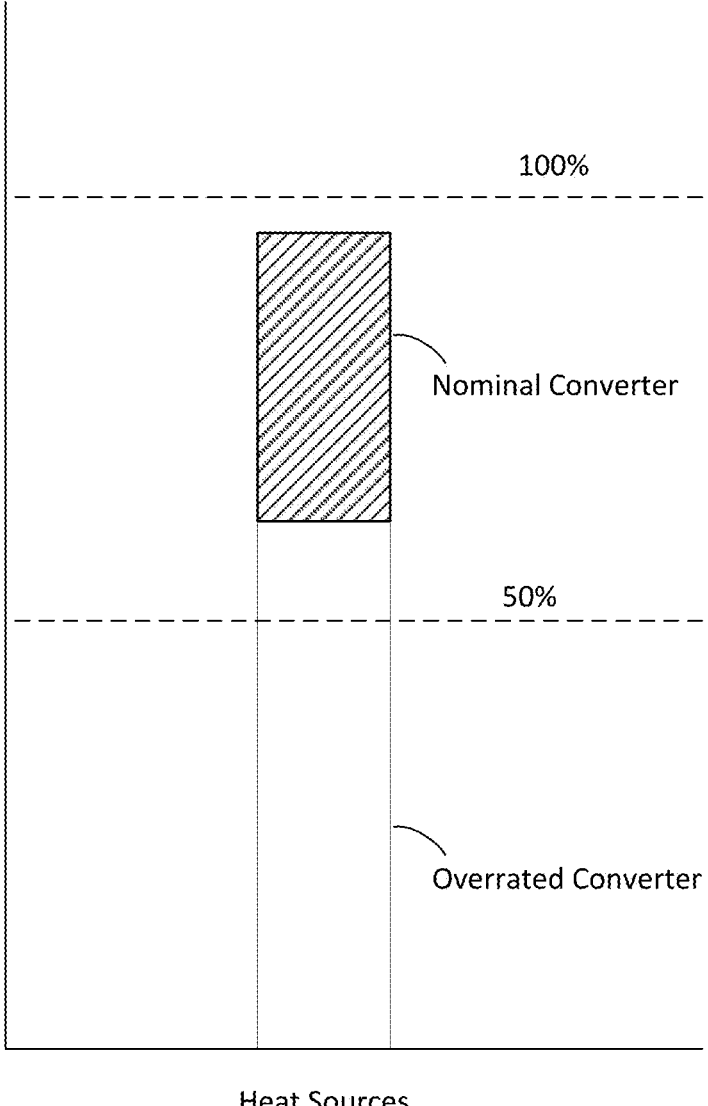
FIG. 5 is an illustrative depiction of thermal capacity as utilized by various power converters, in accordance with some embodiments of the present disclosure.

FIG. 5 is an illustrative depiction of thermal capacity as utilized by various power converters, in accordance with some embodiments of the disclosure. The vertical axis displays the thermal capacity (%) of a power electronics module as a function of the heat sources (i.e., power converters) within the power electronics module. As used herein, the thermal capacity is defined for a power electronics module as a ratio of an amount of heat generated by the power electronics module over a maximum amount of heat that can be tolerated by the power electronics module. This maximum amount of heat may be imposed by any of the thermal constraints listed above, or any other feasible thermal constraint. An asymmetrical power electronics module corresponding to the performance characteristics of FIG. 5 would operate at ~95% of the total thermal capacity, with ~65% of the heat output generated by the overrated converter and ~35% of the heat output generated by the nominal converter. Therefore, in contrast to operation of a symmetrical power electronics module, one power converter (i.e., the overrated power converter) uses more than half of the thermal capacity of the asymmetrical power electronics module.

In some embodiments, a desired power operation may be achieved within a thermal capacity limit through the use of an asymmetrical power electronics module. For example, it may be desirable to provide power to a given load using a single DC to DC converter. However, based on a thermal capacity limit associated with a power electronics module and based on a target output power to provide to the given load, it may not be feasible for a single DC to DC converter within a symmetrical power electronics module to provide the necessary power (i.e., if the power electronics module's AC to DC converter generates a heat output that is roughly equal to that of its DC to DC converter when powering the given load, then the thermal capacity limit associated with the power electronics module would be surpassed). Therefore, an asymmetrical power electronics module may be used such that the overrated DC to DC converter may solely provide power to the given load and the nominally rated AC to DC converter may provide some of the power that is used by the DC to DC converter. In such an implementation, at least one other AC to DC converter would provide additional power to the overrated DC to DC converter. In some embodiments (e.g., if it is desirable to receive power from the grid using a single AC to DC converter), the opposite implementation (as compared to this prior example) may be utilized.

Figure 6:
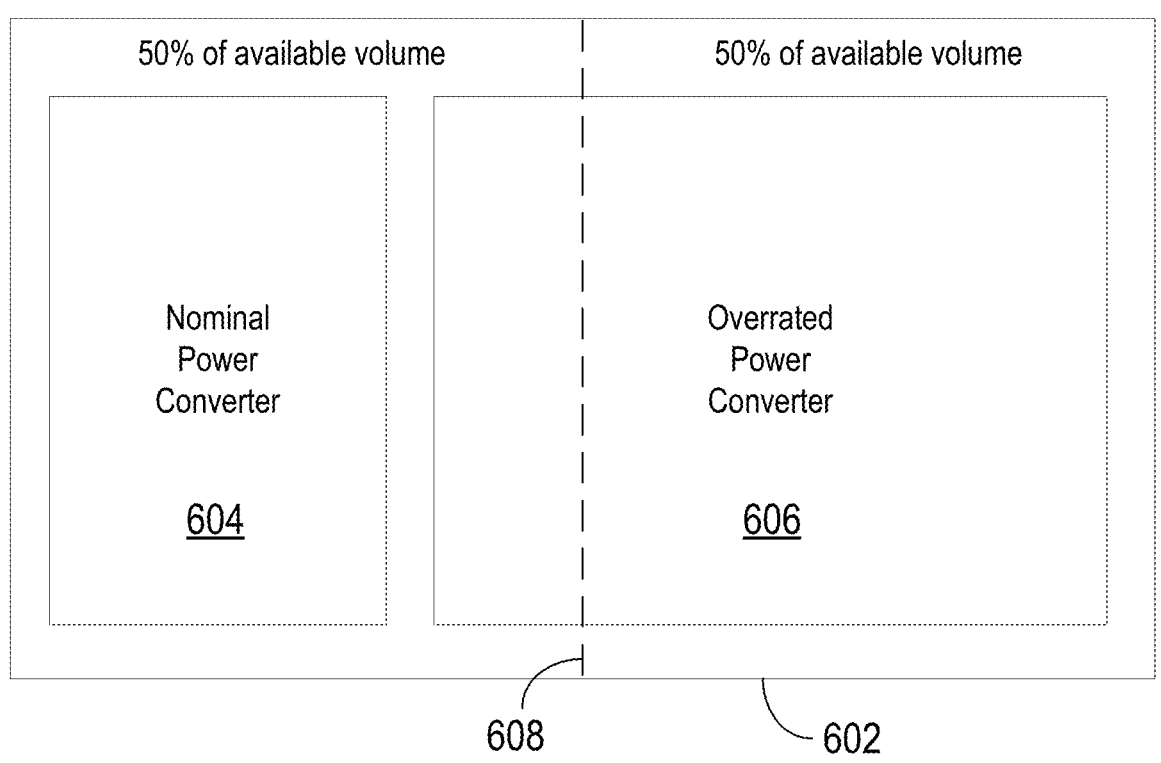
FIG. 6 is an illustrative depiction of packaging volume utilized by various power converters, in accordance with some embodiments of the present disclosure.

FIG. 6 is an illustrative depiction of packaging volume utilized by various power converters, in accordance with some embodiments of the disclosure. The total power electronics module packing volume 602 encloses the nominal power converter 604 and the overrated power converter 606. The dashed line 608 separates volume 602 into two regions (i.e., to the left and right of the line), each of which represents 50% of the available volume within the power electronics module. Due to extending past dashed line 608, overrated power converter 606 occupies more than half of the total power electronics module packing volume 602. By difference, nominal power converter 604 occupies less than half of the total power electronics module packing volume 602.

Based on a desired maximum power rating associated with one power converter of a power electronics module, and based on one or more spatial constraints associated with the power electronics module (e.g., the volume of an available enclosure, the availability of space on-site, any other spatial constraint, or any combination thereof), it may not be feasible to use two power converters each with the desired maximum power rating (i.e., a symmetrical power electronics module with the desired maximum power rating would not fit in an available space associated with the power electronics module). Therefore, an asymmetrical power electronics module may be used such that only the overrated power converter has the desired maximum power rating. In such an implementation, the overrated power converter would occupy more than half of the volume of the asymmetrical power electronics module and the nominal power converter would occupy less than half of the volume. In some embodiments, the volumetric ratio of the overrated and nominal power converters is approximately equal to the maximum power rating ratio of the overrated and nominal power converters.

Based at least on the device characteristics depicted in FIGS. 3-6, an asymmetrical power electronics module may include either one of the DC to DC power converter and the AC to DC power converter as its the overrated power converter. Which one of the power converters is overrated, and the ratio of the maximum power rating of the overrated power converter over the maximum power rating of the nominal power converter, may depend on the power conversion efficiency, service life, thermal capacity utilization, volume utilization, any other characteristic, or any combination thereof for each of the overrated and the nominal power converters. In some embodiments or configurations, the asymmetrical power electronics module operates at the maximum power rating of the nominal power converter, such that the overrated power converter runs at an operational capacity equal to the ratio of the nominal power converter's maximum power rating over the overrated power converter's maximum power rating.

Figure 7:
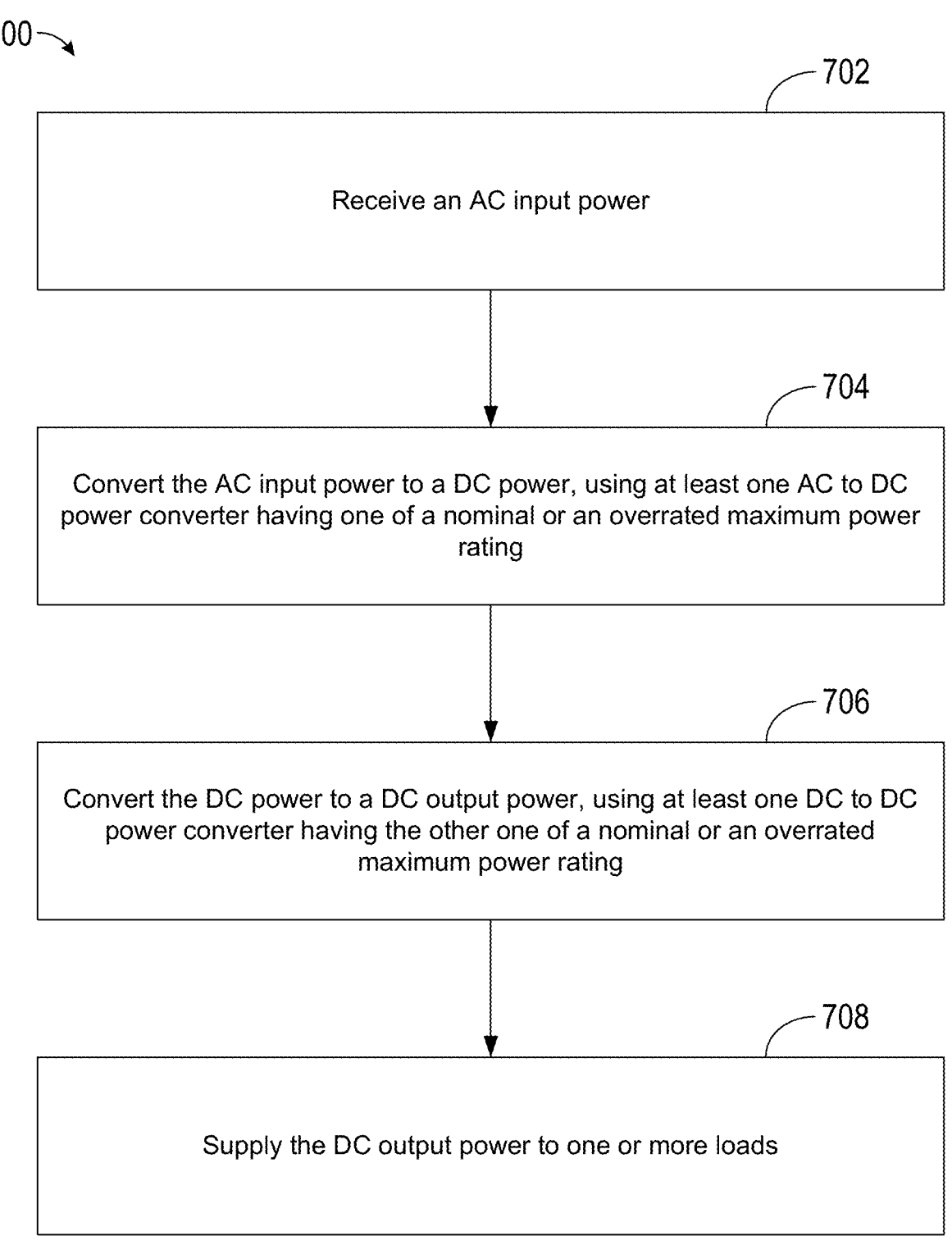
FIG. 7 is an illustrative flowchart of a method for asymmetrical power conversion, in accordance with some embodiments of the present disclosure.

FIG. 7 is an illustrative flowchart 700 of a method for asymmetrical power conversion, in accordance with some embodiments of the disclosure. At 702, the asymmetrical power electronics module receives an AC input power. In some embodiments, the AC input power is received from an electric grid.

At 704, the asymmetrical power electronics module converts the AC input power to a DC power, using at least one AC to DC power converter having one of a nominal or an overrated maximum power rating. In some embodiments, it is desirable to receive AC input power from a minimal number of AC to DC power converters, such that the AC to DC power converter has the overrated maximum power rating. In some embodiments, there is a relatively low limit (e.g., as imposed by an electric grid) to how much AC input power a single AC to DC converter may receive, such that the AC to DC power converter has the nominal maximum power rating. In some embodiments, that DC power is at a voltage level equal to the average voltage level of the AC input power.

At 706, the asymmetrical power electronics module converts the DC power to a DC output power, using at least one DC to DC power converter having the other one of a nominal or an overrated maximum power rating. In some embodiments, it is desirable to supply the DC output power from a minimal number of DC to DC power converters, such that the DC to DC power converter has the overrated maximum power rating. In some embodiments, there is a relatively low limit (e.g., as imposed by a load receiving the DC output power) to how much DC output power a single DC to DC converter may supply, such that the DC to DC power converter has the nominal maximum power rating. In some embodiments, that DC output power is at a higher voltage level than the DC power.

At 708, the asymmetrical power electronics module supplies an output power to one or more loads. In some embodiments, the output power is supplied to an energy storage device. In some embodiments, the output power corresponds to a target power level associated with the one or more loads. The target power level may be determined by communication circuitry 208 and may be implemented by processor 204 based on instructions stored in memory 206.

Figure 8:
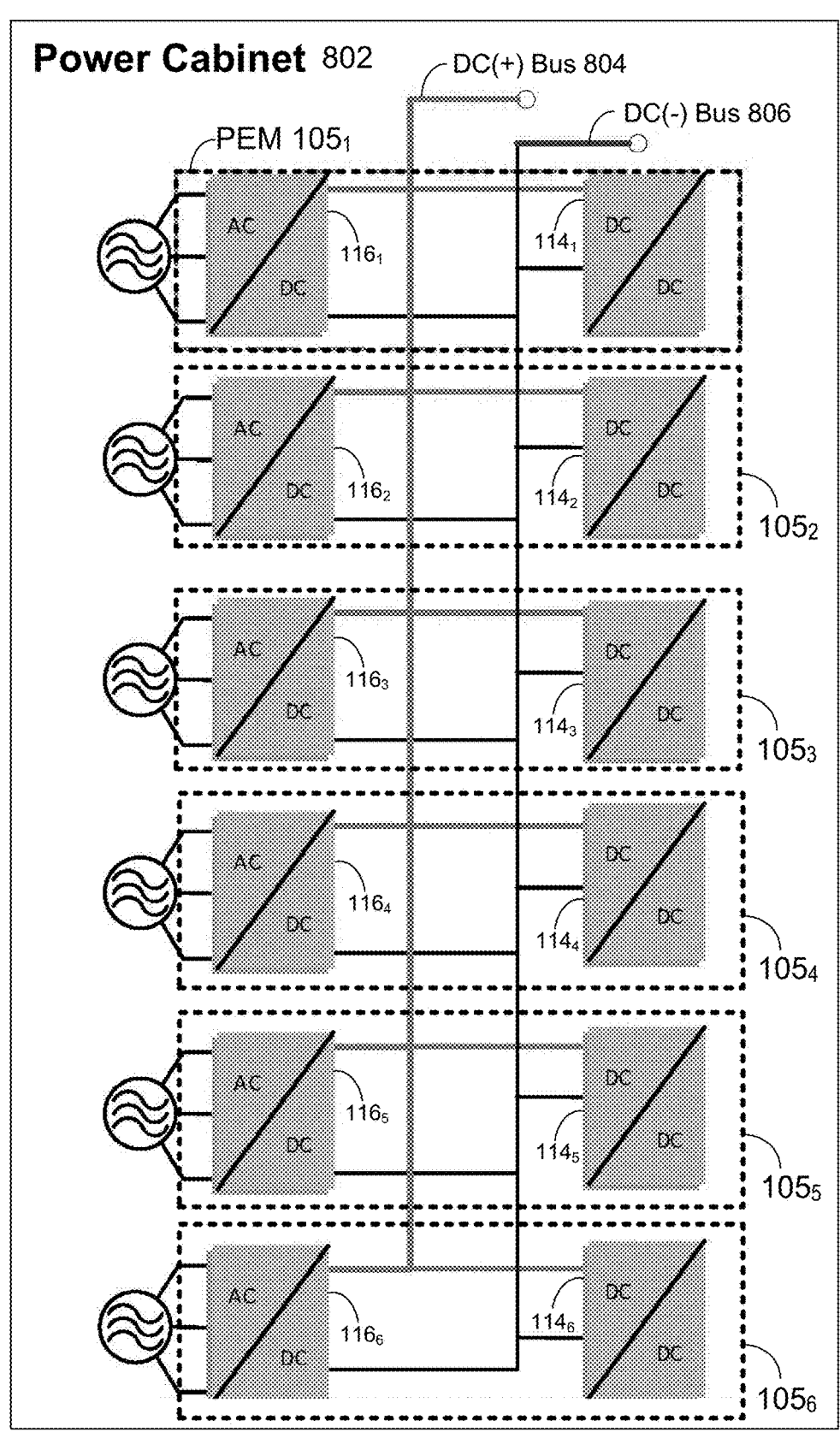
FIG. 8 is an illustrative block diagram showing additional details of some components of a power cabinet having a shared DC bus, in accordance with some embodiments of the present disclosure.

FIG. 8 is an illustrative block diagram showing additional details of some components of a power cabinet having a shared DC bus, in accordance with some embodiments of the disclosure. Power cabinet 802 is a different embodiment of power cabinet 104 (e.g., as shown in FIGS. 1-2) and includes a shared DC bus (including positive DC bus 804 and negative DC bus 806) coupled to each PEM 105$_i$ between the output of AC to DC converter 116$_i$ and the input of DC to DC converter 114$_i$. Through the shared DC bus, one or more AC to DC converter 116$_i$ may provide power to one or more DC to DC converter 114$_i$. In some embodiments, each DC to DC converter 114 is isolated from both an input and an output of power cabinet 802.

The shared DC buses 804 and 806 of power cabinet 802 permits the sharing of power from one or more AC to DC converter 116$_i$ to one or more DC to DC converter 114. In some embodiments, when implementing power cabinet 802 with asymmetrical power electronics modules, power may be shared between a first quantity of nominal power converters and a second quantity, less than the first quantity, of overrated power converters. For example, two 50 kW AC to DC converters may receive an AC power input from the grid and provide a DC power to the shared bus. Then, one 100 kW DC to DC converter may receive the full DC power from the shared bus and provide a DC output power to a load. As discussed above, such an arrangement may improve at least one of the power conversion efficiency, service life, thermal capacity, and packaging volume of the corresponding asymmetrical power electronics module as compared to a similar and symmetrical power electronics module (e.g., containing two 50 kW AC to DC converters and two 50 kW DC to DC converters).

Based on the shared DC buses 804 and 806, one or more AC to DC converters 116 may provide power that is used by one or more DC to DC converters 105 (e.g., as described in steps 704 and 706). For example, a first number of overrated power converters may provide or receive power from a second number, greater than the first, of nominal power converters.

FIG. 9 is an illustrative flowchart 900 of a of a method for providing a target DC power output using a plurality of nominal AC to DC converters and at least one overrated DC to DC converter, in accordance with some embodiments of the disclosure. At 902, the power cabinet (e.g., power cabinet 104 including a shared DC bus or power cabinet 802) receives a target DC power output (e.g., from main controller 202, external device 220, any other power cabinet controller, or any combination thereof). This target DC power output may be determined by the current state-of-charge of a vehicle, the current state-of-charge of a battery, another characteristic of a load associated with the DC power, an availability of input power, any other suitable power characteristic, or any combination thereof. At 904, the power cabinet selects a plurality of AC to DC converters having a nominal power rating, from a plurality of asymmetrical power electronics modules, to provide the target DC power output to a shared bus (e.g., DC bus 804). The number of selected AC to DC converters may be determined by at least the target DC power output and one or more characteristics of each AC to DC converter. For example, when configured with 50 kW AC to DC converters, in response to a 150 KW target DC power output, three or more AC to DC converters may be selected. At 906, the power cabinet selects at least one DC to DC converter having an overrated power rating, from the plurality of power electronics modules, to provide the target DC power output from the shared bus to a load. The number of the least one DC to DC converters may be determined by at least the target DC power output and one or more characteristics of each DC to DC converter. In some embodiments, selecting more than one DC to DC converter includes selecting fewer DC to DC converters than the plurality of AC to DC converters as selected in step 904 (e.g., fewer overrated power converters are used than nominal power converters). In addition to the maximum power rating, the one or more characteristics of a given power converter considered in steps 904 and 906 may include the power conversion efficiency, service life, thermal capacity, and spatial configuration of each power converter FIG. 10 is an illustrative flowchart 1000 of a method for providing a target DC power output using at least one overrated AC to DC converter and a plurality of nominal DC to DC converters, in accordance with some embodiments of the disclosure. At 1002, the power cabinet (e.g., power cabinet 104 including a shared DC bus or power cabinet 802) receives a target DC power output (e.g., from main controller 202, external device 220, any other power cabinet controller, or any combination thereof). This target DC power output may be determined by the current state-of-charge of a vehicle, the current state-of-charge of a battery, another characteristic of a load associated with the DC power, an availability of input power, any other suitable power characteristic, or any combination thereof. At 1004, the power cabinet selects at least one AC to DC converter having an overrated power rating, from a plurality of power electronics modules, to provide the target DC power output to a shared bus (e.g., DC bus 804). In some embodiments, selecting more than one AC to DC converter includes selecting fewer AC to DC converters than the plurality of DC to DC converters that will be selected in step 1006. The number of selected AC to DC converters may be determined by at least the target DC power output and one or more characteristics of each AC to DC converter. At 1006, the power cabinet selects a plurality of DC to DC converters having nominal power ratings, from the plurality of power electronics modules, to provide the target DC power output from the shared bus to a load. The number of selected DC to DC converters may be determined by at least the target DC power output and one or more characteristics of each DC to DC converter. In addition to the maximum power rating, the one or more characteristics of a given power converter considered in steps 1004 and 1006 may include the power conversion efficiency, service life, thermal capacity, and spatial configuration of each power converter.

In view of flowcharts 900 and 1000, examples are provided for selecting the number of AC to DC converters and DC to DC converters that are used therein. In some embodiments, these selections may be determined by main controller 202 based on instructions received from communication circuitry 208 and corresponding instructions stored in memory 206. For example, communication circuitry 208 may receive a target power output and instructions in memory 206 may correspondingly select a number of AC to DC converters and DC to DC converters to use based on the target power output and one or more characteristics of the converters. In some embodiments, the number of overrated power converters may be selected such that each active overrated power converter provides an equal amount of power and the net operation corresponds to a maximum net power conversion efficiency. For example, a target output power of 180 kW may be provided by two overrated power converters, each operating at 90 kW, or may be provided by three overrated power converters, each operating at 60 kW, based on the power conversion efficiency characteristics (e.g., as shown in FIG. 3) of these converters. In turn, the number of nominal power converters may be selected such that each active nominal power converter provides an equal amount of power and the net operation corresponds to a maximum net power conversion efficiency. For example, the target output power of 180 kW may be supplied by five nominal power converters, each operating at 36 kW, or may be provided by six nominal power converters, each operating at 30 kW, based on the power conversion efficiency characteristics (e.g., as shown in FIG. 3) of these converters. In some embodiments, different levels of power may be provided by respective overrated and/or nominal power converters. In some embodiments, service life or thermal capacity utilization may be maximized instead of or in addition to power conversion efficiency.

The processes discussed above are intended to be illustrative and not limiting. One skilled in the art would appreciate that the steps of the processes discussed herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A system
for converting between alternating current (AC) power and direct current (DC) power, the system comprising:
one or more power converters having a nominal power rating; and one or more overrated power converters having an overrated power rating with respect to the nominal power rating, wherein:
the one or more power converters and the one or more overrated power converters are electrically coupled to provide the DC power,
the one or more power converters is one of one or more AC to DC power converters and one or more DC to DC power converters,
the one or more overrated power converters is the other of the one or more AC to DC power converters and the one or more DC to DC power converters,
a total number of the one or more power converters is the same as a total number of one or more overrated power converters, and
no other power converters are configured to be electrically coupled with the one or more power converters and the one or more overrated power converters to provide the DC power.

2. The system of claim 1, wherein the one or more overrated power converters has a power conversion efficiency that is greater when operating at the nominal power rating than at the overrated power rating.

3. The system of claim 1, wherein the one or more overrated power converters has an expected service life that is longer at the nominal power rating than at the overrated power rating.

4. The system of claim 1, wherein the one or more overrated power converters occupies more than half of a packaging space of the power electronics module.

5. The system of claim 1, wherein more than half of a total heat capacity of the system is utilized by the one or more overrated power converters when operating at the overrated power rating.

6. The system of claim 1, wherein the one or more power converters is the one or more AC to DC power converters and the one or more overrated power converters is the one or more DC to DC power converters.

7. The system of claim 1, wherein the one or more power converters is coupled in series to the one or more overrated power converters.

8. The system of claim 1, wherein the system converts between AC and DC power using a plurality of power electronics modules, wherein:
each power electronics module of the plurality of power electronics modules comprises at least one of the one or more power converters and at least one of the one or more overrated power converters;
each power electronics module of the plurality of power electronics modules comprises an AC to DC power converter and a DC to DC power converter; and
the system further comprises a shared DC bus, wherein an output of the AC to DC power converter of each of the plurality of power electronics modules is electrically coupled to the shared DC bus.

9. The system of claim 8, further comprising control circuitry configured to:
cause output power of at least two of the AC to DC power converters to provide a net DC power over the shared DC bus to one of the DC to DC power converters; and
cause the one DC to DC power converter to provide a net DC power to a load.

10. The system of claim 8, further comprising an output switching bus configured to provide a net output power from at least two of the DC to DC power converters to a load.

11. The system of claim 8 further comprising control circuitry configured to:

cause output power of one of the one or more AC to DC power converters to be provided as shared DC power over the shared DC bus to at least two of the one or more DC to DC power converters.

12. The system of claim 1, wherein the overrated power rating is two or more times the nominal power rating.

13. A method comprising:

converting an alternating current (AC) input power to a direct current (DC) output power using one or more power converters having a nominal power rating and one or more overrated power converters having an overrated power rating with respect to the nominal power rating, wherein:

the one or more power converters and the one or more overrated power converters are electrically coupled to provide the DC output power, the one or more power converters is one of one or more AC to DC power converters and one or more DC to DC power converters, the one or more overrated power converters is the other of the one or more AC to DC power converters and the one or more DC to DC power converters, a total number of the one or more power converters is the same as a total number of one or more overrated power converters, and no other power converters are configured to be electrically coupled with the one or more power converters and the one or more overrated power converters to provide the DC output power.

14. The method of claim 13, wherein operating the one or more overrated power converters at the nominal power rating improves an efficiency of the one or more overrated power converters as compared to operating the one or more overrated power converters at the overrated power rating.

15. The method of claim 13, wherein operating the one or more overrated power converters at the nominal power rating extends a service life of the one or more overrated power converters as compared to operating the one or more overrated power converters at the overrated power rating.

16. The method of claim 13, further comprising packaging the one or more power converters and the one or more overrated power converters in a single enclosure having a volume, wherein the one or more overrated power converters occupies more than half of the volume.

17. The method of claim 13, further comprising packaging the one or more power converters and the one or more overrated power converters in a single enclosure with a heat capacity limit, wherein the one or more overrated power converters utilizes more than half of the heat capacity limit.

18. The method of claim 13, wherein converting the AC input power to the DC output power comprises:

electrically coupling a plurality of power electronics modules through a shared DC bus, wherein each power electronics module of the plurality of power electronics modules comprises at least one of the one or more power converters and at least one of the one or more overrated power converters.

19. The method of claim 18, further comprising coupling a net power output from the plurality of power electronics modules to a load.

20. A power cabinet comprising:

a plurality of power electronics modules configured to convert alternating current (AC) input power to direct current (DC) output power, each power electronics module of the plurality of power electronics modules comprising an AC to DC converter and a DC to DC converter, wherein:

one of the AC to DC converter and the DC to DC converter has a nominal power rating and the other one of the AC to DC converter and the DC to DC converter has an overrated power rating greater than the nominal power rating, a total number of AC to DC converters of the power electronics modules is the same as a total number of DC to DC converters of the plurality of power electronics modules, and no other power converters are configured to be electrically coupled with the AC to DC converters and the DC to DC converters of the plurality of power electronics modules to provide the DC output power.

\* \* \* \* \*